United States Patent
Glushko et al.

(10) Patent No.: US 6,309,729 B1
(45) Date of Patent: Oct. 30, 2001

(54) OPTICAL MEMORY DEVICE AND A METHOD FOR MANUFACTURING THEREOF

(75) Inventors: Boris Glushko, Ashdod (IL); Eugene Levich, New York, NY (US)

(73) Assignee: TriDStore IP, L.L.C., New Castle, DE (US)

( * ) Notice: Subject to any disclaimer, the term of this patent is extended or adjusted under 35 U.S.C. 154(b) by 0 days.

(21) Appl. No.: 09/490,063

(22) Filed: Jan. 24, 2000

Related U.S. Application Data (62) Division of application No. 08/956,052, filed on Oct. 22, 1997, now Pat. No. 6,039,898.
(60) Provisional application No. 60/045,985, filed on May 8, 1997.

(51) Int. Cl.[7] .................................................. B32B 3/02
(52) U.S. Cl. ...................... 428/64.1; 428/64.4; 428/64.8; 428/457; 428/690; 428/913; 430/270.12; 430/495.1; 430/945; 369/283; 369/288
(58) Field of Search ..................... 428/64.1, 64.2, 428/64.4, 64.8, 457, 690, 913; 430/270.12, 270.14, 495.1, 945; 369/283, 288

(56) References Cited

U.S. PATENT DOCUMENTS

| | | |
|---|---|---|
| 4,090,031 | 5/1978 | Mas . |
| 4,788,015 | 11/1988 | Sakai et al. . |
| 5,009,818 | 4/1991 | Arai et al. . |
| 5,063,556 | 11/1991 | Chikuma . |
| 5,373,491 | 12/1994 | Terao et al. . |
| 5,591,500 | * 1/1997 | Kawanishi ................... 428/64.1 |
| 5,591,501 | * 1/1997 | Ovshinsky ................... 428/64.1 |
| 5,635,114 | 6/1997 | Hong . |
| 5,904,969 | * 5/1999 | Kamezaki ................... 428/64.1 |

FOREIGN PATENT DOCUMENTS

| | | |
|---|---|---|
| 0188311A2 | 4/1986 | (EP) . |
| 0197256A2 | 10/1986 | (EP) . |
| 2702080A1 | 9/1994 | (FR) . |
| WO9111804A1 | 8/1991 | (WO) . |
| WO9321638A1 | 10/1993 | (WO) . |

* cited by examiner

*Primary Examiner*—Elizabeth Evans
(74) *Attorney, Agent, or Firm*—Birch, Stewart, Kolasch & Birch, LLP

(57) ABSTRACT

An optical memory device and a method for manufacturing thereof. An optical memory device has at least one data layer formed on a substrate. An upper surface of the substrate is formed with a pattern comprising a plurality of regions which are capable of obtaining, when covered by a recording medium, desired optical properties different from those of the substrate. The patterned surface of the substrate is coated with the recording medium. The recording medium is removed from the patterned surface after the recording regions have obtained the desired optical properties.

6 Claims, 7 Drawing Sheets

OPTICAL MEMORY DEVICE AND A METHOD FOR MANUFACTURING THEREOF

This application is a divisional of application Ser. No. 08/956,052, filed on Oct. 22, 1997 now U.S. Pat. No. 6,039,898 issued Mar. 21, 2000, the entire contents of which are hereby incorporated by reference which claims benefit of Provisional No. 60/045,985 filed May 8, 1997.

FIELD OF THE INVENTION

The present invention relates to methods for manufacturing optical memory devices such as compact discs (CD), tapes, cards, wires, cylindrical drums, or the like, the information from which is read out by optical means.

BACKGROUND OF THE INVENTION

Compact discs are known optical memory devices which are widely used particularly with playback and computer devices for retrieving musical and software compositions. Such devices typically comprise only one information carrying layer and, therefore, suffer from a limited amount of recorded data.

Three-dimensional optical memory devices have been developed typically comprising a plurality of parallel, spaced-apart layers having information carrying regions in which optical properties differ from those of adjacent regions of the layers. One example of such a device is disclosed in U.S. Pat. No. 4,090,031. The device comprises a substrate and a plurality of data layers provided on one side of the substrate. Each of the layers comprises data tracks formed of lines of data spots. The data spots are, in turn, formed of either binary coded digital information or frequency or pulse length modulated analog information which is photographically recorded. The data spots are light reflective. Selection of one data track for playback is accomplished by changing the focus of a reading light beam from one data layer to another, or by making the data tracks of materials having different optical properties, the reading light being of different wavelengths for different layers. To this end, different color dyes or different photoluminescent materials are used and corresponding color filters are selectively positioned in front of light detectors.

The device is manufactured in the following manner. The data layers are made of photosensitive, reflective material such as photographic film or another suitable recording material including printing ink. The data spots are formed of light reflecting metal material having a reflecting index different from that of the data layers. The data spots are fabricated by either vapor deposition through a mask having an aperture corresponding to the data spots, or etching through a photoresist mask.

It is thus evident that such a device suffers from multiple over-reflection when retrieving the information from the layers. Indeed, a reading beam would pass through all the layers, wherein each layer is reflective. This results in the number of layers being limited to two or three layers only. Additionally, such a technology based on the use of a photomask does not provide high information density, and is, therefore, not effective. It is appreciated that a process of manufacturing of such a device is very complicated and time-consuming. It is also understood that an extremely expensive technique is required for the production of each layer and, thereby, the entire process is very expensive. Therefore, such process is not suitable for mass production.

SUMMARY OF THE INVENTION

It is a major object of the present invention to provide a novel method of manufacturing an optical memory device, particularly such a method which is suitable for mass production of the optical memory devices.

It is a further object of the present invention to provide such a method which enables to manufacture a multi-layered optical memory device.

It is a still further object of the present invention to provide such a method which is suitable for manufacturing a recordable optical memory device.

There is thus provided according to one aspect of the present invention a method of manufacturing an optical memory device having a data layer formed on a substrate, the method comprising the steps of:

(a) forming an upper surface of the substrate with a pattern having a plurality of regions which are capable of obtaining, when covered by a recording medium, desired optical properties different from those of the substrate;

(b) coating the patterned surface of the substrate with the recording medium; and (c) removing the recording medium from the patterned surface after the recording regions have obtained the desired optical properties.

In the step (a), the pattern may be in the form of a surface relief on the upper surface of the substrate. This may be achieved by forming the upper surface of the substrate with a plurality of recesses, for example, by means of a stamper device. Alternatively, the substrate itself may be in the form of a stamper substrate, in which case the method may also comprise, subsequently to the step (c), the step of placing an optical film onto the stamper substrate so that the recording medium filled in the recesses of the stamper substrate is stuck to the film in the regions corresponding to the recording regions on the stamper substrate. Each of the recesses has a sufficient depth to be at least partially filled with the recording medium.

The step of forming the pattern may comprise the step of forming the upper surface of the substrate with regions having adsorbing properties for adhering the recording medium thereto. This may be achieved by either processing the substrate at respective regions, or coating respective regions with an adsorbing material capable of holding thereon the recording medium.

The substrate is made of a transparent material. The recording medium may be made of a fluorescent or scattering material. The recording medium may be multi-layered and made, for example, of a reflective material coated by a fluorescent material.

According to another aspect of the present invention there is provided a method of manufacturing a three-dimensional optical memory device formed of a plurality of spaced-apart data layers each formed on a substrate, the method comprising the steps of:

(i) forming an upper surface of each of the substrates with a pattern comprising a plurality of regions which are capable of obtaining, when covered by a recording medium, desired optical properties different from those of the substrate;

(ii) coating the patterned surface of the substrate with the recording medium;

(iii) removing the recording medium from the patterned surface after the recording regions have obtained the desired optical properties; and (iv) providing an attachment between the data layers.

According to yet another aspect of the invention, there is provided an optical memory device comprising a transparent data layer having an upper surface thereof patterned with a plurality of spaced-apart recording regions formed of a material having optical properties different from those of the transparent layer.

According to yet another aspect of the invention, there is provided a multi-layered optical memory device comprising a plurality of spaced-apart transparent layers, each layer having an upper surface thereof patterned with a plurality of spaced-apart recording regions formed of a material having optical properties different from that of the transparent layer.

More specifically the present invention is used for manufacturing multi-layered compact discs and is, therefore, described below with respect to this application.

BRIEF DESCRIPTION OF THE DRAWINGS

In order to understand the invention and to see how the same may be carried out in practice, several preferred embodiments will now be described, by way of example only, with reference to the accompanying drawings, in which.

DETAILED DESCRIPTION OF THE PREFERRED EMBODIMENTS

Figure 1A:
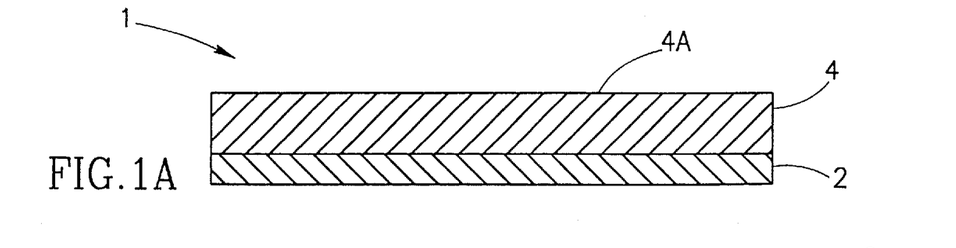
FIGS. 1a to 1i illustrate a method of manufacturing a multi-layered optical disc according to one embodiment of the present invention.

Referring to FIGS. 1a–1i, there are illustrated the main steps of a method for manufacturing an optical disc, according to one embodiment of the invention. The method is based on a so-called 'photopolymer curing technique'. FIG. 1a shows a structure, generally designated 1, which comprises a support base 2 formed of a transparent material such as, for example, glass, polyester, polycarbonate, coated with a substrate layer 4 formed of a liquid photopolymer. For example, the layer 4 may be made of such materials as UV lacquer 1322 000 40039 or the like commercially available from Phillips Coating B.V., Holland, or UV adhesive Kayarad DVD-003 or the like commercially available from Nippon Kayaku Co. Ltd. The thickness of the base 2 is within a range of 0.002–1.2 mm, while the substrate layer 4 is substantially thin being of about 5–30$\mu$ in thickness.

Figure 1B:
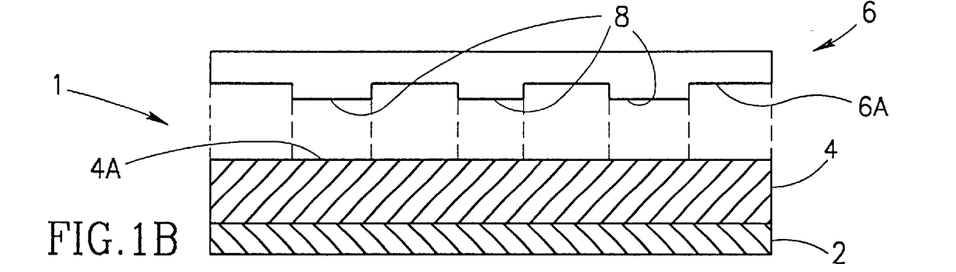

FIG. 1b illustrates a durable stamper 6 having a patterned outer surface 6a formed of a specific arrangement of a plurality of convexities or so-called 'stamper bumps', generally at 8. The convexities 8 are typically of 0.3–0.5$\mu$ in height, which height is of about 50–200% of the convexity length. The convexity's height and length are variable, depending on an encoded information which have to be stored in the disc. The convexities occupy about10–30%, and preferably 20%, of the stamper's surface 6a. The stamper 6 is made of a transparent material so as to allow UV illumination to pass therethrough, as will be described further below. The stamper 6 is typically manufactured from a 'master disc'-using one of the conventional mastering and replication processes which are widely used in the optical disc memory industry, applying such known techniques as laser beam recording, photoresist developing, electroplating, electroforming, etching, disc molding, etc. These techniques are known per se and, therefore, need not be specifically described. The stamper 6 could be manufactured by etching a master glass or quartz disc with a developed photoresist layer.

Figure 1C:
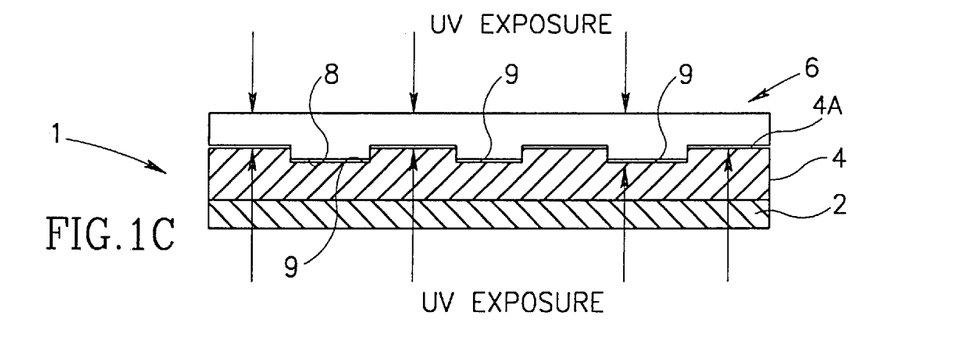

The stamper 6 is applied to the structure 1 by means of pressing it against an upper surface 4a of the substrate layer 4. As shown in FIG. 1c, this results in providing a pattern on the surface 4a, which pattern is similar to that of the surface 6a. More specifically, the surface 4a is formed with a corresponding plurality of recesses or pits, generally at 9, arranged similar to the convexities 8. Ultra-violet (UV) light is radiated through either the transparent substrate 2 or transparent stamper 6 in order to cure the photopolymer 4 and, in the patterned form, adhere the latter to the substrate 2.

Figure 1D:
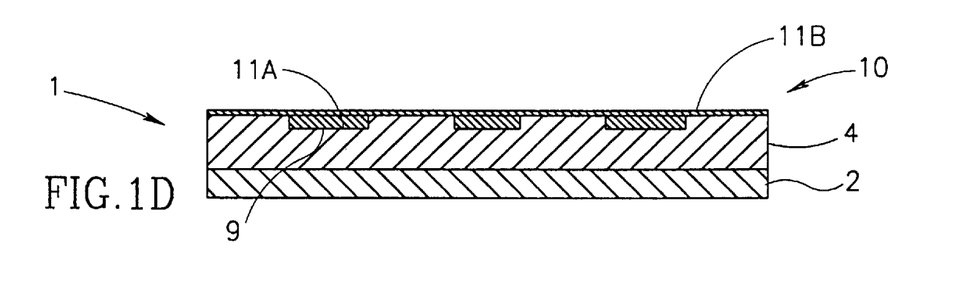

Thereafter, as shown in FIG. 1d, a working layer 10 is deposited onto the patterned surface 4a of the substrate layer 4. The layer 10 is formed of a liquid material 11 (constituting a recording medium) such as, for example, fluorescent material containing an organic or non-organic dye, photochromic material, scattering material like a white paint, reflective material like a metal paint, etc. The fluorescent material is a solution of a fluorescent substance in a solvent monomer or in a mixture of various polymers, elastomers and solvents. It should be noted that the material 11 for the working layer 10 is chosen so as to have good adhesion properties to the substrate layer 4 in order to provide durability of the memory device. It is appreciated that the liquid substance 11 partly penetrates into the recesses 9, defining regions 11a within the recesses 9, and, due to a strong adhesion, partly remains on the surface 4a, defining regions 11b located between the recesses 9. The thickness D of the regions 11a is substantially equal to recesses' depth, while, in order to optimize the coating procedure, the thickness d of the regions 11b is such as to satisfy the following condition:

$$d \ll D$$

To this end, the structure 1 is continuously rotated during the deposition of the working material 11. Initially, the rotation is relatively slow so as to facilitate homogeneous distribution of the working element 11 over the surface 4a. Thereafter, the rotation is speeded up so as, on the one hand, to remove an excess of the working material 11 from the regions 11b and, on the other hand to obtain the uniform distribution thereof within the regions 11a. More specifically, the coating procedure should be such that the thickness d of the layer 10 in the regions 11b be less than 20% of the thickness D of the layer 10 within the regions 11a.

In order to improve the adhesion, a thermal polymerization or a so-called 'baking technique' is used, wherein 'baking time' is of about 10 minutes or less. Alternatively, an oxidation polymerization could be employed.

In order to remove the remaining working substance 11 from the regions 11b, although not specifically shown, the substrate layer 4 is washed by a suitable solvent such as, for example, ethanol, tetrafluoropropanol or the like, and dried. To this end, the layer 4 undergoes controllable and highly uniform dissolution by means of simultaneous spinning and spraying thereof by a suitable solvent material. A dispensing head (not shown) is appropriately employed for dispersing the solvent material over the structure 1. Preferably, the solvent is initially applied to a central area of the structure's surface and, thereafter, to a periphery thereof. A solved fluorescent material is then removed from the rotating structure. In order to improve the removal of the solved fluorescent material from the regions 11b, the solvent may contain suitable inclusions. Additionally, the dispersing head could be equipped with soft brushes for facilitating the removal of the solved fluorescent material. Both the inclusions and brushes should be, on the one hand, soft enough so as to prevent possible damage of the substrate layer 4 underneath the regions 11b and, on the other hand, big enough in size so as to prevent removal of the fluorescent material from the regions 11a.

Figure 1E:
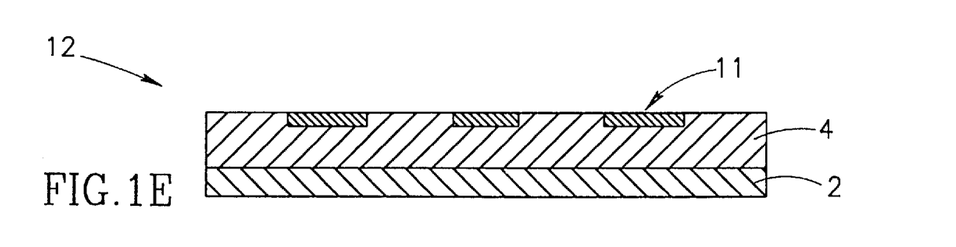

As clearly illustrated in FIG. 1e, the above results in the provision of the working material 11 within the regions 11a inside the recesses 9, which regions 11a are surrounded by substantially transparent regions 11b of the layer 4. Hence, a one-layer compact disc, generally designated 12, is provided. The regions 11a represent data spots formed on the fluorescent material 11 surrounded by the transparent regions 11b and the substrate layer 4. It is important to note that the fluorescent material may be replaced by a reflecting, scattering or the like working material, whose optical properties are thereby different from that of the transparent substrate layer.

Figure 1F:
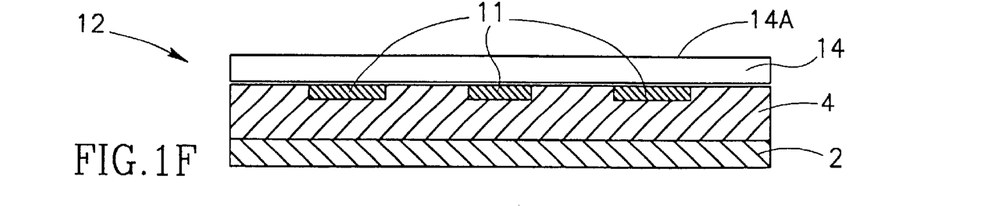
Figure 1G:
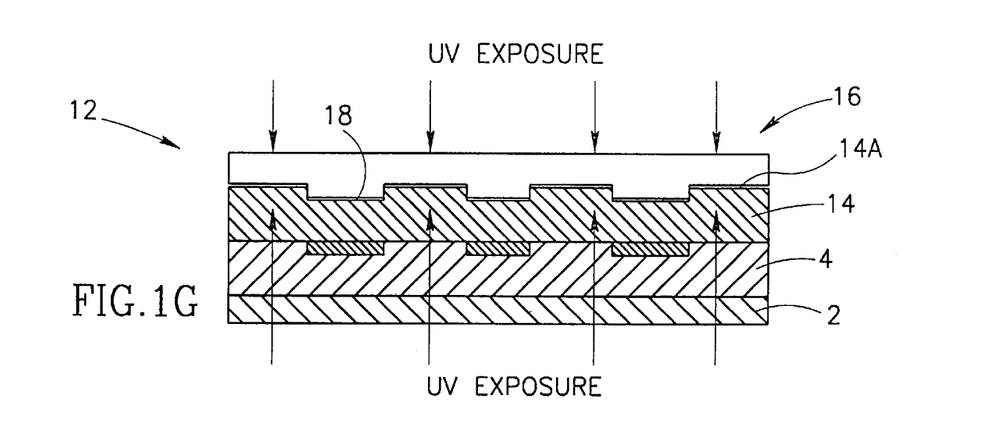

In order to provide a multi-layered structure, the structure 12 is coated with a further photopolymer layer 14 having an outer surface 14a. A transparent stamper 16 is applied to the surface 14a in a manner described above with respect to the stamper 6, and UV light is radiated onto the layer 14 through the transparent stamper 16. The absorption of the UV radiation in the layer 14 protects the fluorescent material 11 within the regions 11b from being bleached by the UV radiation. It is understood that the transparency of the stamper 16 is optional and, alternatively, the UV light may be radiated through the transparent base 2 and the cured photopolymer 4. As a result, the surface 14a of the photopolymer 14 becomes formed with a plurality of recesses 18.

Figure 1H:
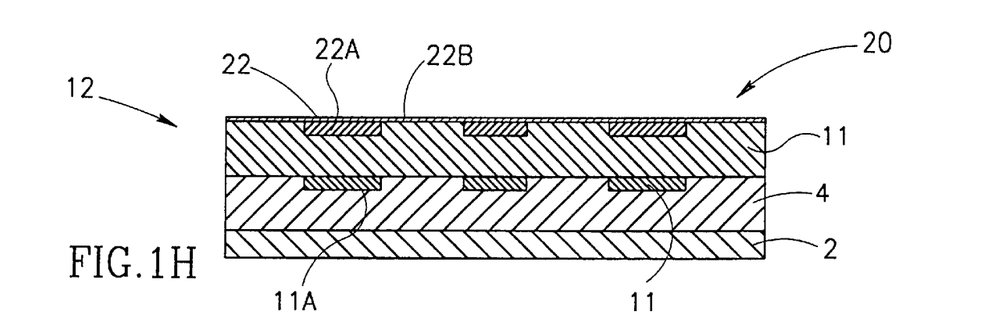
Figure 1I:
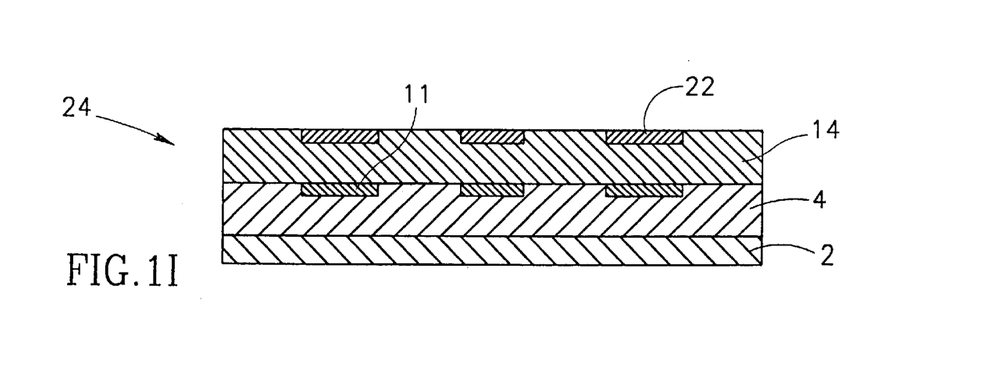

A working layer 20 formed of a fluorescent material 22 is laminated onto the patterned surface 14a, which results in the provision of regions 22a and 22b located between and inside the recesses 18, respectively. Fast spinning, baking, washing and drying processes are, then, repeated for providing a two-layered compact disc, generally designated 24 (FIG. 1i).

It will be readily understood that a desired number of layers can be fabricated in the manner described above. The number of layers is limited solely by a permissible thickness of the whole optical disc, which is typically of about 1–2 mm, in order to be used with a suitable reading device. To this end, a set of 'master discs' together with a corresponding set of stampers is previously produced, including about 5–50 different stampers for manufacturing of a multi-layered disc.

Turning now to FIGS. 2a–2f, there are illustrated the main steps of a method for manufacturing a multi-layered optical disc, which method is based on a so-called 'injection molding technique'. A structure, generally designated 100, comprises a transparent flat base 102 which is coated by a substrate layer 104 formed of an injected resin such as, for example, various grades of polycarbonate, polystyrene, polyester, or the like. To this end, the resin layer 104 is pressed between the flat base 102 and a stamper 106 and is injection molded in a well known manner for patterning a surface 104a of the layer 104. The latter becomes formed with a plurality of specifically arranged recesses 109.

Figure 2A:
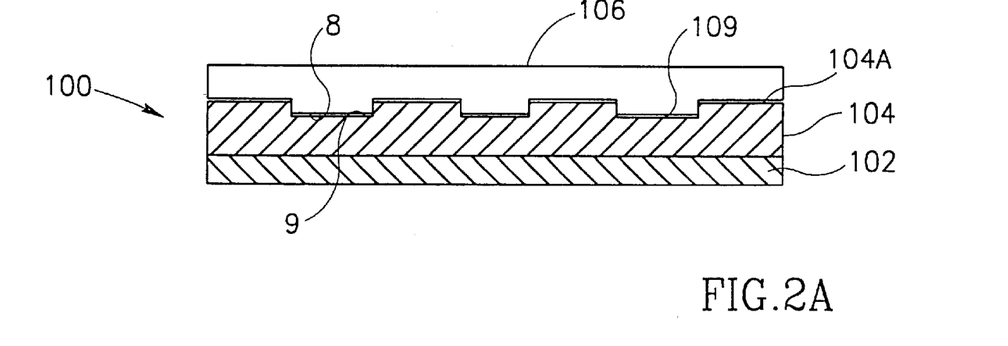
FIGS. 2a to 2f illustrate a method according to another embodiment of the present invention.
Figure 2B:
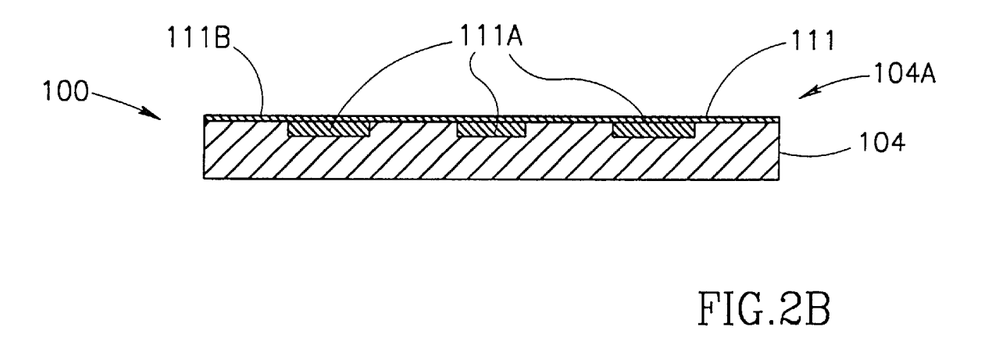
Figure 2C:
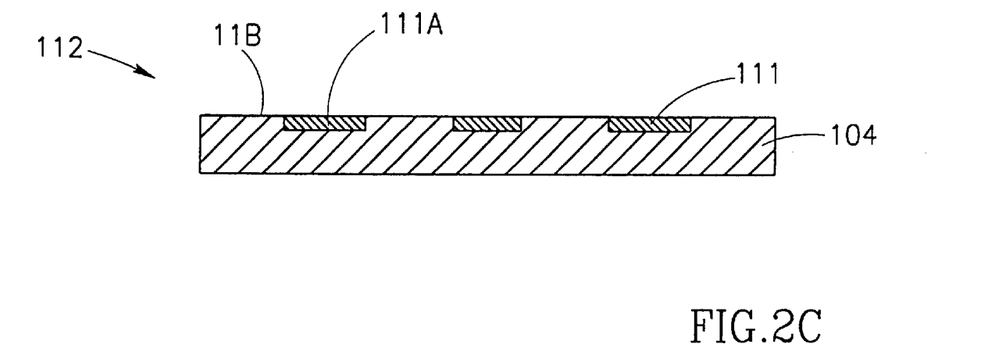
Figure 2D:
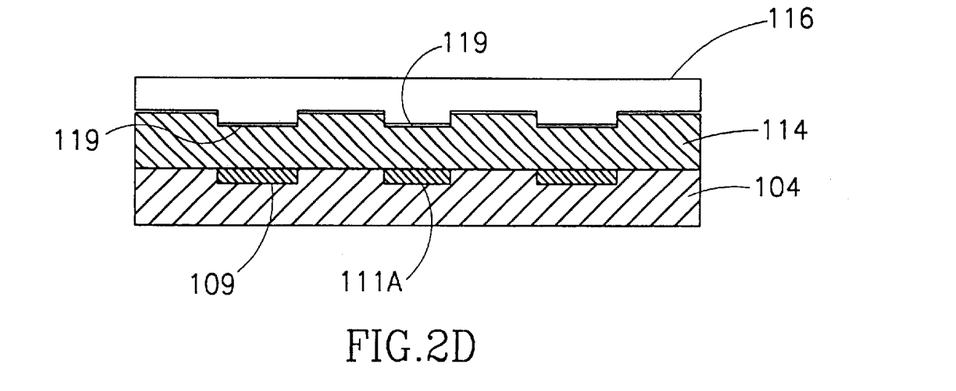

Thereafter, the base 102 may be optionally removed. The molded surface 104a is coated by a liquid fluorescent substance 111 which partly penetrates inside the recesses 109 defining regions 111a and partly remains on the surface 104 defining regions 111b between the recesses 109. The obtained structure is spun so as to remove an excess of the fluorescent material 111 from the regions 111b and baked so as to settle the fluorescent material 111 within the regions 111a. The layer 104 is washed and the whole structure is spun, which results in the provision of a one-layer memory device 112, in which the regions 111b are cleaned from the fluorescent substance 111, while, owing to the adhesion processes, the latter remains within the regions 111a.

Figure 2E:
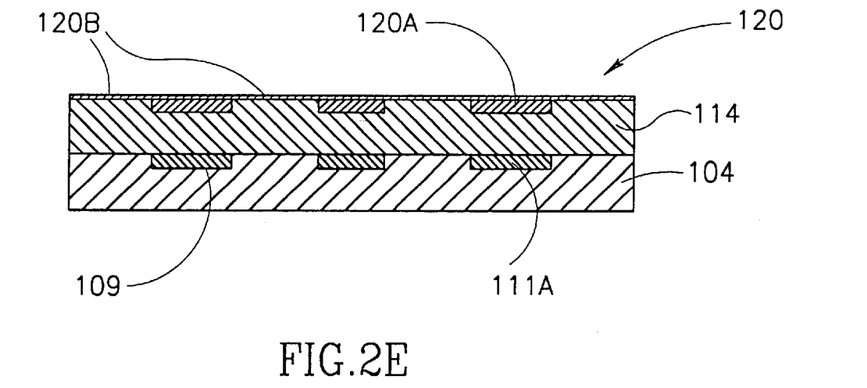
Figure 2F:
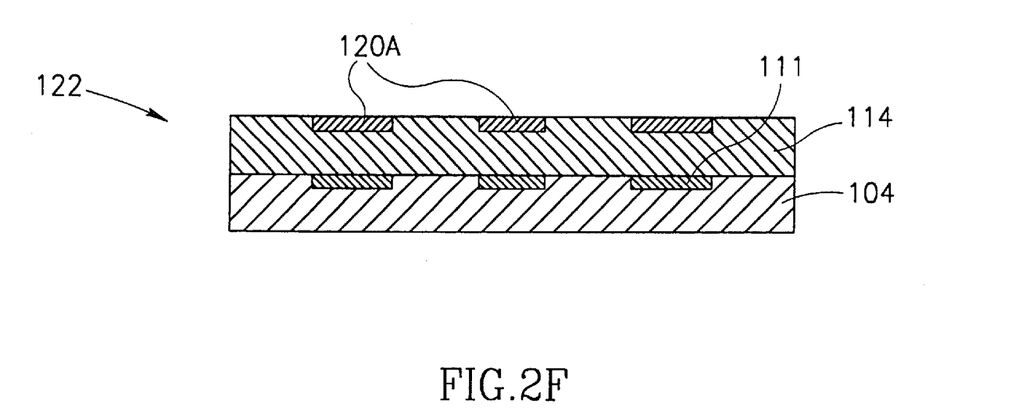

A next layer 114 of the irreversible resin is injection molded in a manner described above applying another stamper 116 so as to form a surface 114a of the layer 114 with a plurality of recesses 119. A fluorescent material 120 is deposited onto the surface 114a so as to be located solely within regions 120a inside the recesses 119, as shown in FIGS. 2e and 2f in a self-explanatory manner. Two layers 112 are bound together by means of either UV adhesives as described above or thermoplastic hot melt adhesive such as, for example, thermoplastic elastomer. Macromelt Q 8740 or the like commercially available from Henkel Corp., U.S.A. Thus, a double-layered disc 122 is formed.

Figure 3A:
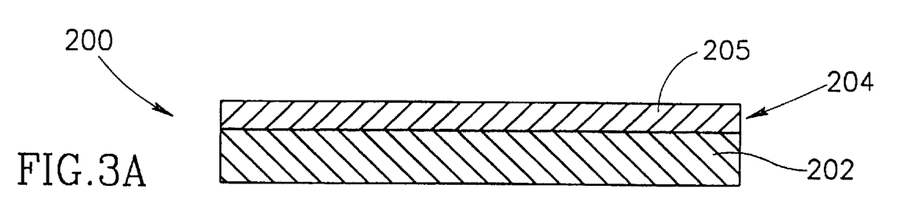
FIGS. 3a to 3i illustrate a method according to yet another embodiment of the present invention.
Figure 3B:
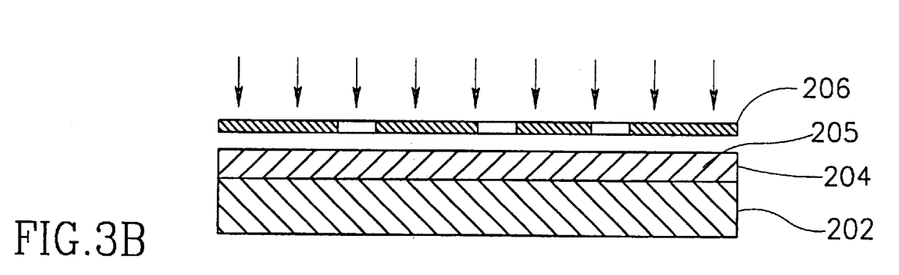
Figure 3C:
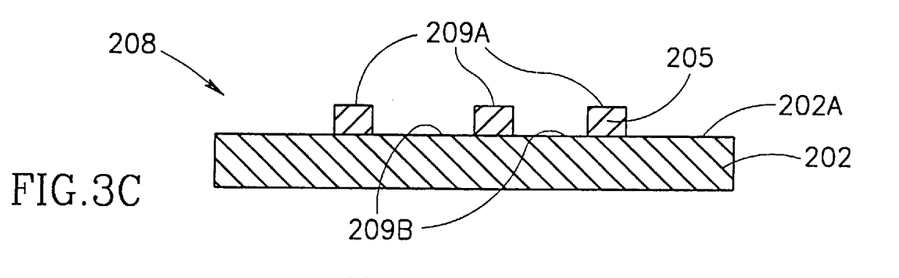
Figure 3D:
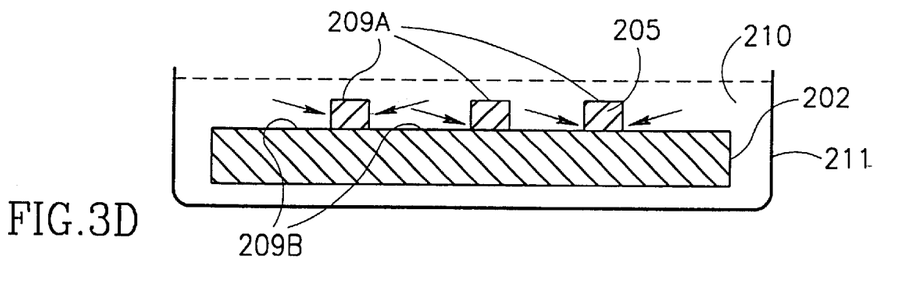

Reference is now made to FIGS. 3a–3i which illustrate another example of a method for manufacturing a multi-layered optical disc according to the invention. A structure 200 is provided being formed of a glass or ceramic base 202 coated by a substrate layer 204 which is formed of a photoresist material 205. As shown in FIG. 3b, the photoresist layer 204 is appropriately exposed through a photomask 206 in a conventional, so-called 'modern photolithographic' manner. This results in the provision of a desired pattern 208 formed of a plurality of regions 209a of the photoresist material 205 specifically arranged on a surface 202a of the base 202 defining thereby regions 209b located between the regions 209a. The patterned structure is then dipped into a fluorescent dye solution 210 contained in a vessel 211. It is appreciated that both the photoresist and fluorescent material are chosen such that the photoresist material is capable of adsorbing this fluorescent material. The fluorescent dye 210 partly penetrates into the photoresist material 205 within the regions 209a and partly remains within the regions 209b (FIG. 3d). To this end, the base 202 should be either formed of or coated by a material resistant to the dye penetration. Obviously, if such a protective coating is employed, it is chosen so as to allow for easy removal thereof from the regions 209b, when desired.

Figure 3E:
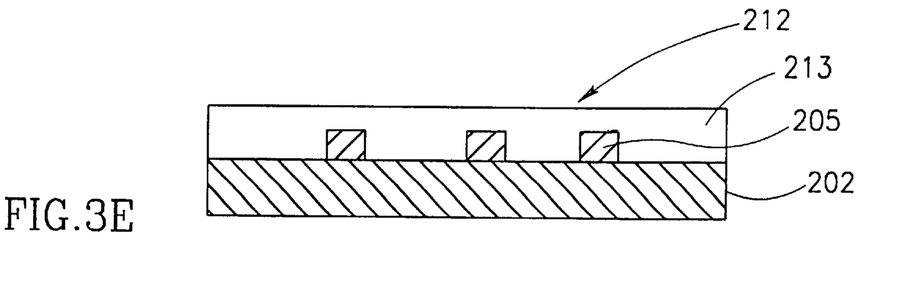
Figure 3F:
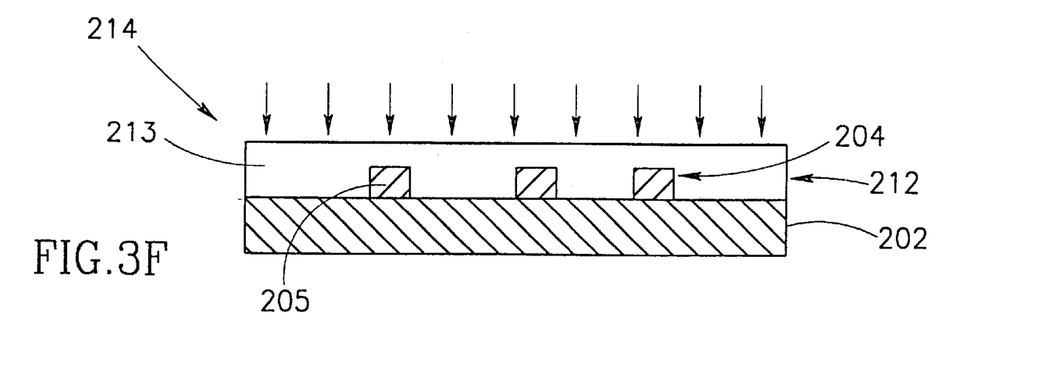

Thereafter, although not specifically illustrated, the fluorescent material 210 is removed from the regions 209b by washing and cleaning procedures as described above. As shown in FIG. 3e, the resulted structure is coated by an additional layer 212 which is made of a transparent material 213 such as, for example, the same photoresist mixture but without the light sensitive components. If the photoresist 205 is based on Polymetilmetacrylat (PMMA), then the latter could be used as the material 213 for the additional layer 212. The illumination of the layer 212 with UV light and/or baking provides desirable hardening and protection. Hence, a one-layer disc, generally designated 214, is provided.

Figure 3G:
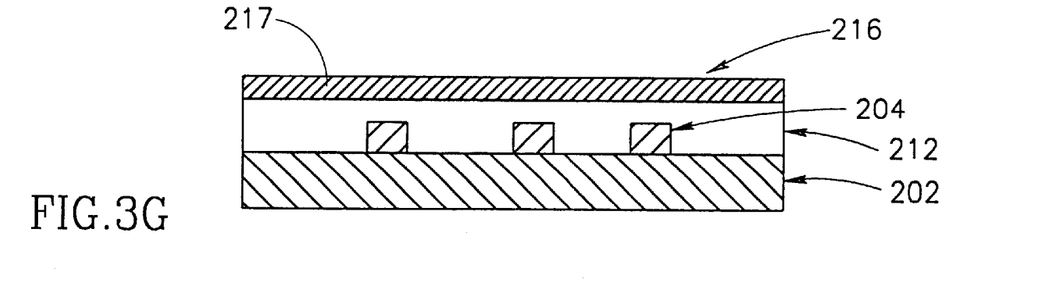
Figure 3H:
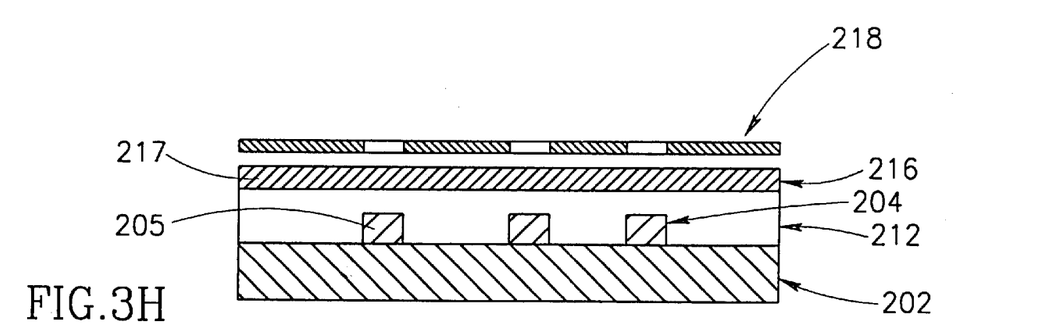
Figure 3I:
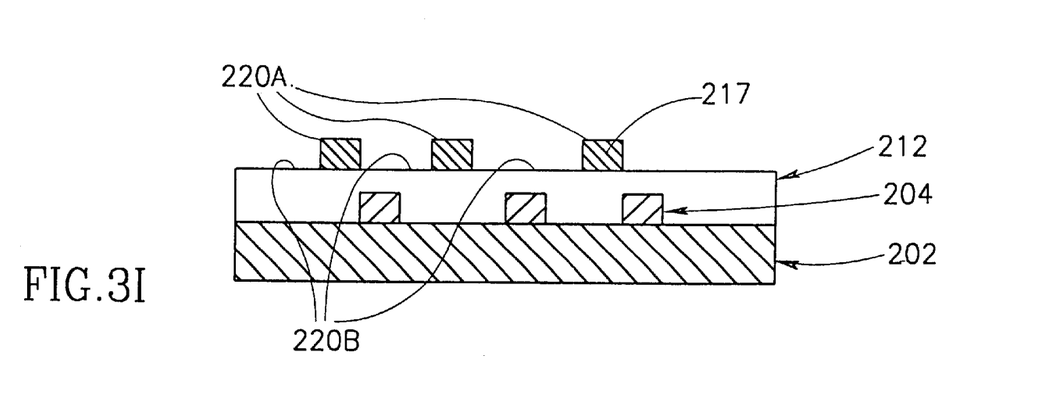

As shown in FIG. 3g, in order to provide a multi-layered structure a further layer 216 formed of a photoresist material 217 is deposited on the layer 212 and exposed through a photomask 218 so as to obtain a desired pattern formed of a plurality of regions 220a of the photoresist material which are specifically arranged on a surface of the layer 216 defining regions 220b between the regions 220a. It is appreciated that further processes of inserting the fluorescent dye into the regions 220a, removing the dye from the regions 220b and coating the structure by an intermediate protective layer would complete a two-layered optical disc, which is not specifically shown.

Yet another example of a method according to the invention is now described with reference to FIGS. 4a–4d. A structure, generally at 300, which comprises a thin substrate layer 302 formed of a polycarbonate material is injection molded in the above described manner employing a stamper 304. As a result, a specific arrangement of recesses 306 is obtained on an outer surface of the substrate layer 302.

Figure 4A:
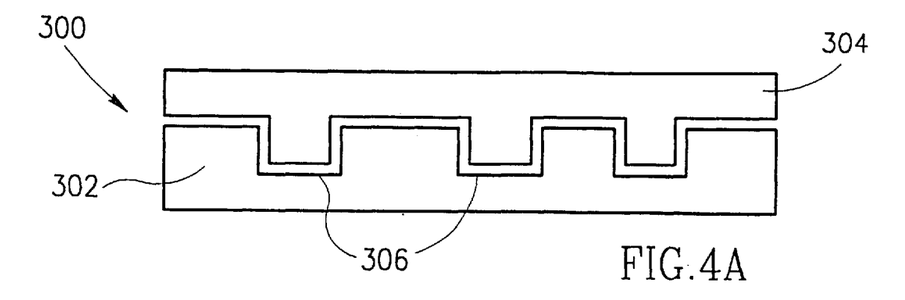
FIGS. 4a to 4d illustrate a method according to yet another embodiment of the present invention.
Figure 4B:
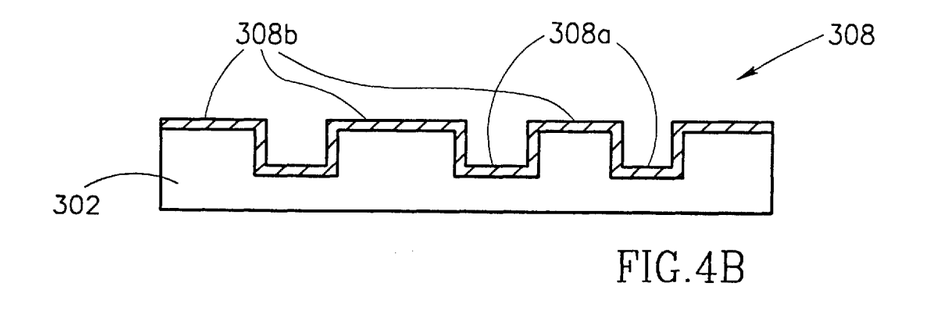

A first, relatively thin, working layer 308 is provided by depositing a reflective metal such as, for example, aluminum, chromium or the like, onto the patterned surface of the substrate layer 302 defining regions 308a inside the recesses 306 and regions 308b between the recesses 306. The thickness of the layer 308 within the regions 308b between the recesses should be substantially less than the depth of the recesses 306.

Figure 4C:
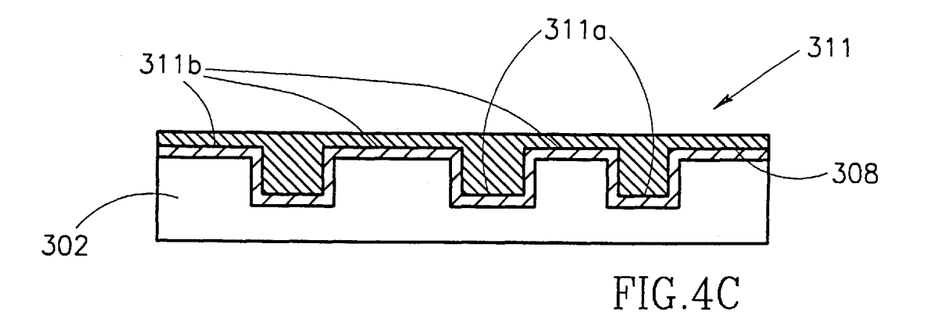

The reflective layer 308 is coated by a second working layer 310 formed of a fluorescent material 311 such as, for example, an organic monomer, polymer or the like dielectric material. The thickness of the layer 310 should be higher than that of the layer 308 within the regions 311b between the recesses 306. To this end, such procedures as spin coating, deep coating, extrusion, or the like could be employed. Additionally, the fluorescent material 311 should be of an etching rate substantially less than that of the reflective metal of the first working layer 308.

Figure 4D:
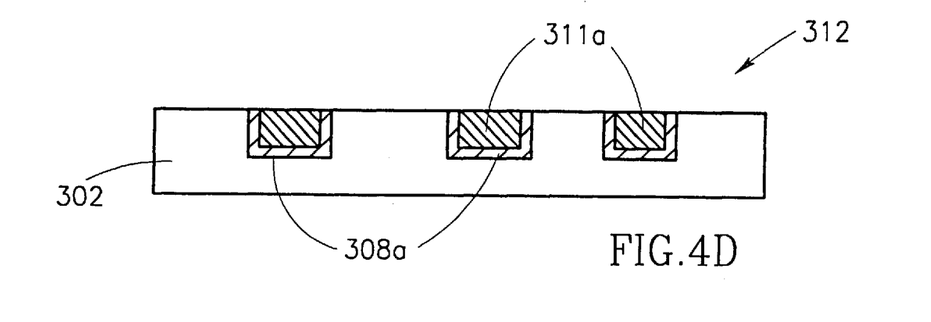

Both the reflective and fluorescent materials are removed from the regions between the recesses 306, by means of a suitable known technique such as, for example, etching, polishing, chemical polishing, etc. A one-layer disc, generally designated 312, is provided, which disc is composed of a transparent substrate layer 302 having its upper surface formed with the recording regions 311a. In distinction to the previously described examples, the recording regions 311a are formed of the reflective material 308 coated by the fluorescent material 311.

It is appreciated that the provision of such a reflective material underneath the fluorescent material, on the one hand, increases the fluorescent properties of the material 311 and, on the other hand, provides a desired protection for the substrate layer 302 when removing therefrom the excess of the fluorescent material 311. Obviously, although not specifically shown, a multi-layered structure may be obtained by gluing such devices 312 to each other in the above described manner.

It is desired to eliminate or at least substantially reduce the reflection of the device 312 in respect of reading light. This may be achieved by oxidizing the metal layer 308 from a corresponding side thereof. To this end, a chromium oxide should preferably be used as the material for the lower surface of the layer 308.

It is thus evident that in comparison to the prior art techniques for manufacturing the optical discs, in which reflective recording regions are spaced by reflective substrate regions, the present invention enables to significantly increase the data density of an optical memory device. Indeed, according to the conventional approach, the height of the recording region should be of about $\lambda/4$, wherein $\lambda$ is a wavelength of reading light. On the contrary, according to the present invention, there are no limitations to the recesses' height owing to the fact they are surrounded by the transparent substrate regions. Additionally, it is understood that the greater the length of the recording region, the more the recorded data contained therein. According to the conventional approach, the increase of the length of the recording region is the only solution for increasing the recorded data contained therein. However, this length is always limited. On the contrary, the present invention enables to increase the recorded data contained within the recording region by increasing the recesses' height. This allows for making the recesses of a minimum possible length, and, therefore, making more recesses within each data layer.

It should be specifically noted that the method according to the invention may be employed for manufacturing a so-called 'recordable optical disc'. In this case and with reference, for example, to FIGS. 1a–1e, the pattern is in the form of a spiral-like recess 9 provided in the upper surface 4a of the substrate layer 4. The recess 9 is filled in with the fluorescent material 11 in the above described manner.

Those skilled in the art will readily appreciate that various modifications and changes may be applied to the invention as hereinbefore exemplified without departing from its scope defined in and by the appended claims.

What is claimed is:

1. A multi-layered optical memory device comprising a plurality of spaced-apart data layers containing a material excitable by incident light to produce fluorescence, each layer having a patterned surface thereof, the pattern being in the form of a plurality of regions containing the fluorescent material and spaced by regions of the layer transparent with respect to the incident light and to said fluorescence, thereby enabling access of all data layers by the incident light.

2. The device according to claim 1, further comprising a material reflective with respect to the incident light and said fluorescence the reflective material being located in the fluorescent material containing regions and being coated by said fluorescent material.

3. The device according to claim 1, wherein the fluorescent material containing regions are spaced-apart recesses.

4. The device according to claim 3, wherein said recesses are in the form of pits.

5. The device according to claim 1, being in the form of a disc.

6. The device according to claim 5, wherein said the fluorescent material containing regions form a continuous spiral-like recess, the disc being thereby of recordable optical disc type.

* * * * *